United States Patent [19]

Jensen

[11] 3,937,879
[45] Feb. 10, 1976

[54] INFORMATION DISPLAY SYSTEM HAVING MAIN AND AUXILIARY SWEEPS

[75] Inventor: Garold K. Jensen, Pinecrest, Va.

[73] Assignee: The United States of America as represented by the Secretary of the Navy, Washington, D.C.

[22] Filed: July 29, 1965

[21] Appl. No.: 476,782

[52] U.S. Cl. ............... 178/7.5 R; 315/395; 315/393
[51] Int. Cl.² ...................... H04N 3/16; H04N 5/44
[58] Field of Search ......... 315/18, 24, 19, 393, 394, 315/395, 399; 343/8; 340/366 CA, 366 F; 178/7.5 R

[56] References Cited
UNITED STATES PATENTS

| | | | |
|---|---|---|---|
| 2,850,668 | 9/1958 | Katz | 315/24 |
| 2,909,773 | 10/1959 | Gamertsfelder | 315/18 X |
| 3,281,841 | 10/1966 | Forestier | 315/18 X |

Primary Examiner—Malcolm F. Hubler
Assistant Examiner—T. M. Blum
Attorney, Agent, or Firm—R. S. Sciascia; R. C. Reed; T. M. Webster

[57] ABSTRACT

Display system capable of rapidly presenting three dimensional information with a minimum of signal-to-noise degradation and particularly suitable for use in a high performance radar system. Three two-parameter display units present information on cathode ray tubes which include deflection circuits driven by main and auxiliary staircase sweep generators.

15 Claims, 11 Drawing Figures

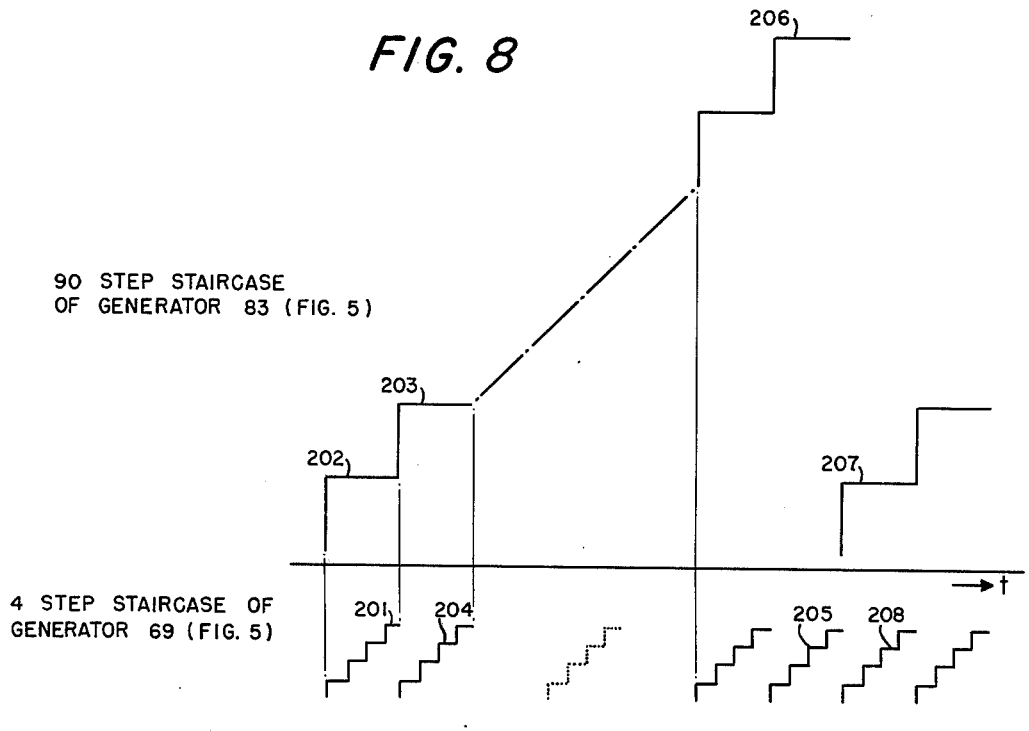
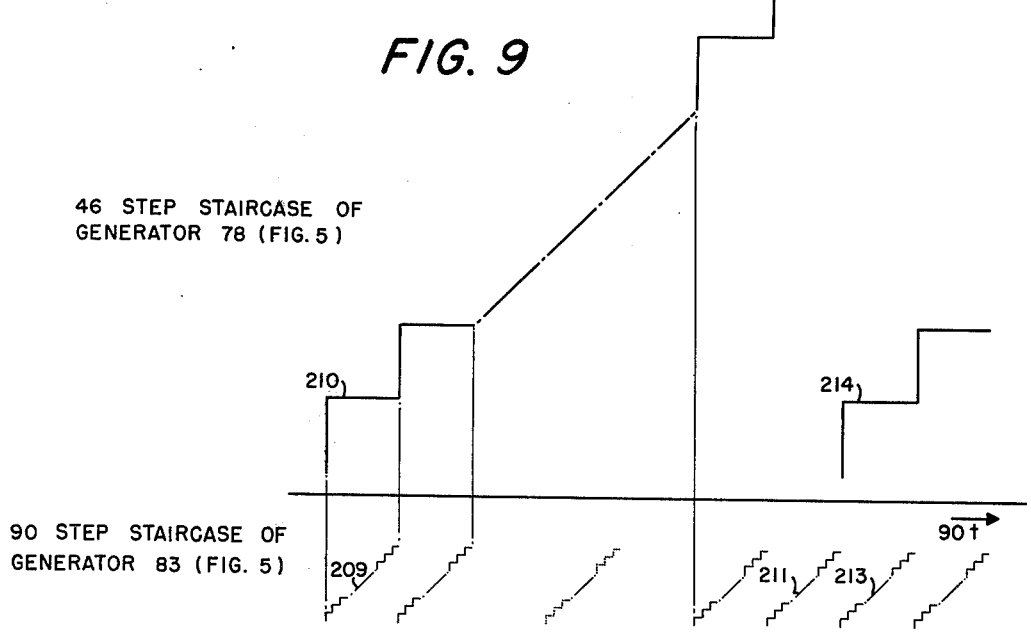

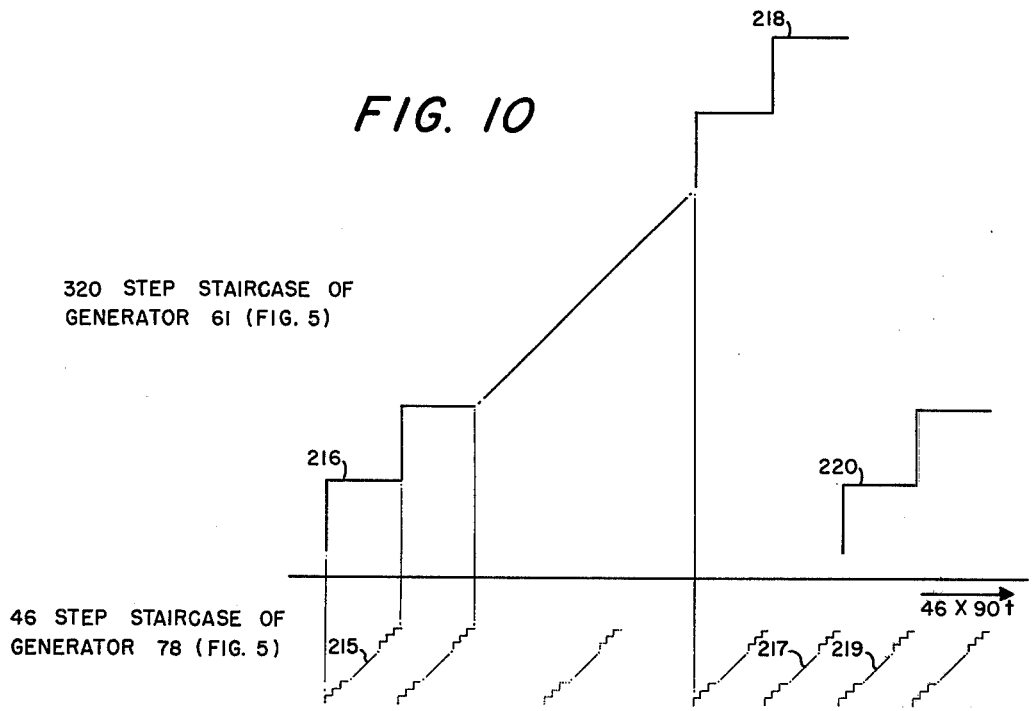
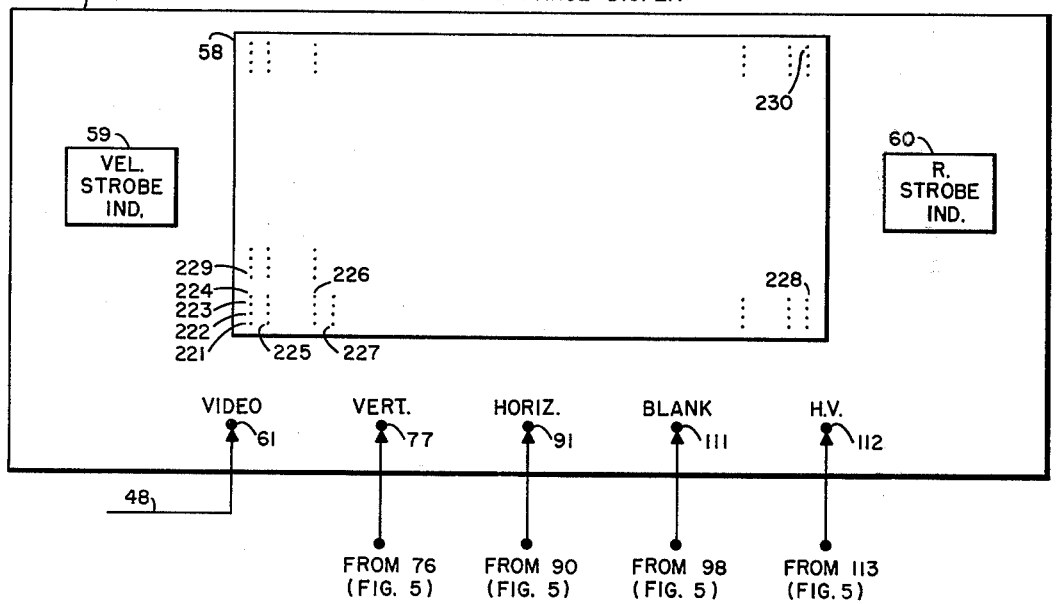

INFORMATION DISPLAY SYSTEM HAVING MAIN AND AUXILIARY SWEEPS

The invention described herein may be manufactured and used by or for the Government of the United States of America for governmental purposes without the payment of any royalties thereon or therefor.

The present invention relates to information display systems and more particularly to video information systems wherein the loss in signal-to-noise ratio incurred in displaying the information is minimized and the efficient use of the available capacity of the video display devices is maximized.

The development of the radar system described in the copending application of Garold K. Jensen and James E. McGeogh, Ser. No. 285,555, filed May 31, 1963, for RADAR SYSTEM, created a need for a display system capable of displaying three dimensional information flowing at a high rate of flow so that the advantages of the radar system could be more fully realized than possible with the use of prior art display systems. As disclosed in the aforementioned copending application, the range, rangerate, (hereinafter referred to as velocity), and acceleration of any target within the range of the radar is detected. In a typical system, the radar will have 23 range gates, 320 velocity gates, and 360 acceleration gates. Since the total information for any one information analysis cycle is equal to the product of the number of gates, the typical system will have over 2.5 million separate bits of information to display during each analysis cycle which is typically approximately 1.7 seconds in duration.

When presented with the problem of displaying three dimensional information at such a high rate of flow, it is necessary to contend with the fact that with present techniques it is convenient to display only two variables on any one display, thus meaning that one variable must be suppressed, and with the additional fact, in the case of a radar, that only a single target signal may be present during a complete analysis cycle thus requiring a cathode ray tube with a long persistence screen. These facts create a problem in that the sweep will tend to repeat on itself and yet if it does repeat on itself, noise will build up on the long persistence screen thus diminishing the signal-to-noise ratio of a target signal thereby causing a loss of information. Furthermore, the large quantity of information that it is necessary to display creates a problem because it is necessary to be able to resolve different bits of information and yet there are only a limited number of resolution elements available each way across the screen of a cathode ray tube.

The present invention, which is described with reference to use with the aforementioned radar system for illustrative purposes only, but which is not limited to such use, overcomes these problems by providing auxiliary sweep generators, as well as the conventional main sweep generators, for the horizontal and vertical sweep circuits of the cathode ray tubes. Staircase generators, rather than sawtooth generators, are used to prevent smearing of the elements on the screen of the tube. The duration of each step, number of steps in each staircase, repetition rate of each staircase, voltage magnitude of each step, and voltage magnitide of each staircase are chosen so that the sweep lines are properly synchronized with the information flow and yet no sweep line will repeat on a prior sweep line and so sweep lines having a large number of elements, such as the acceleration gate sweep, are folded insuring that the number of resolution elements required on any one line are not excessive. The present invention alos overcomes a stability problem caused by the tendency of any fixed frequency to drift by deriving all fixed frequencies from a common reference frequency, which in the system shown for purposes of illustration is 180 cycles per second, and by providing external reset signals, also derived from the common reference frequency, for as many of the sweep generators as possible. Stability is of interest because of the desirability of close synchronization throughout the system. Furthermore, the application of relatively high frequency sweep signals to the deflection circuits of the cathode ray tubes creates problems of synchronizing the sweeps with the flow of information due to the high frequency delay caused by the yokes of the deflection circuits. This problem is solved in the present invention by providing a compensating delay in the information channel.

An object of this invention is to provide a video display system for information which minimizes the loss in signal-to-noise ratio resulting from the display of such information.

Another object is to provide a video display system for three dimensional information.

A further object of the present invention is the provision of a stable display system for three dimensional information wherein the information flows to the display at a high rate of flow.

Still another object is to provide a video display system for information flowing to the display system at a high rate of flow wherein the degradation of the signal-to-noise ratio of such information in being displayed is minimized.

Yet another object of this invention is to provide a stable video display system for three dimensional information flowing to the display at a high rate of flow wherein the degradation of the signal-to-noise ratio of such information in the display is minimized.

A still further object of the present invention is the provision of a stable video display system for three dimensional information flowing at a high rate of flow to the display wherein degradation of the signal-to-noise ratio of such information is minimized and the efficient use of the video display device is maximized.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

FIGS. 4–7, when combined, show a block diagram of the display system of the present invention;

FIG. 8 shows the time relationship of the staircase waveform of the auxiliary sweep generator for the vertical sweep circuit of the velocity vs. range display to the staircase waveform of the auxiliary sweep generator for the horizontal sweep circuit of the velocity vs. range display;

FIG. 9 illustrates the time relationship of the staircase waveform of the auxiliary sweep generator for the horizontal sweep circuit of the velocity vs. range display to the staircase waveform of the main sweep generator for the horizontal sweep circuit of the velocity vs. range display;

FIG. 10 shows the time relationship of the staircase waveform of the main sweep generator for the horizontal sweep circuit of the velocity vs. range display to the staircase waveform of the main sweep generator for the vertical sweep circuit of the velocity vs. range display; and FIG. 11 illustrates the manner in which the screen of the cathode ray tube of the velocity vs. range display is swept.

Figure 1:
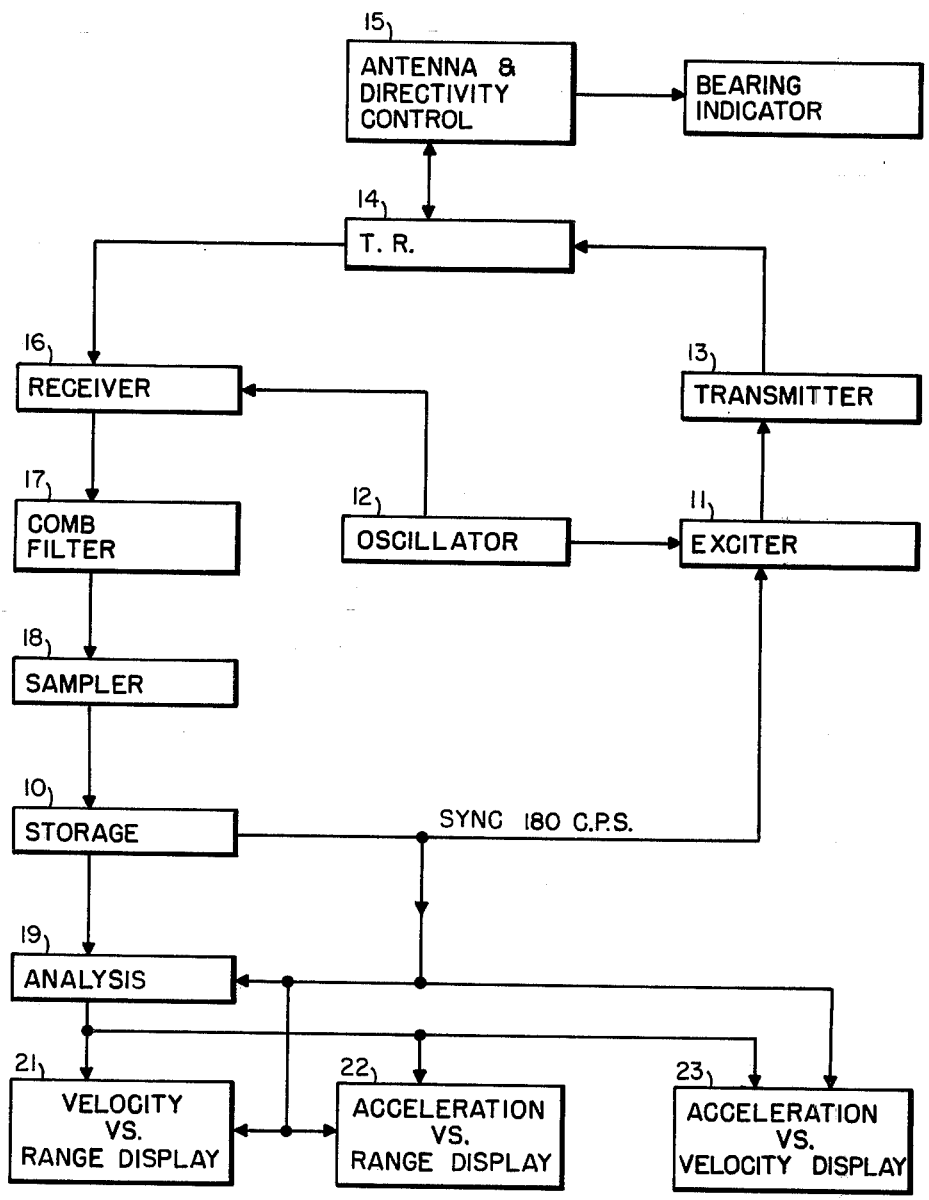
FIG. 1 shows a block diagram of a cross-correlation radar system designed to give range, velocity, and acceleration information for a target.

With reference now to FIG. 1 of the drawing there is shown a cross-correlation radar system constructed in accordance with the teachings of the aforementioned copending application Ser. No. 285,555. This system provides a system gain of about 33 db over conventional radar systems having a direct display of target information and maintains this increased gain even in the case of a target with a high acceleration such as a missile. This notable increase in system sensitivity is obtained by transmitting a plurality of pulses and storing the echo pulses in a position corresponding to the range of the target responsible for the echo and then playing back all signals stored for a particular range in rapid sequence.

The system shown is a phase coherent pulse doppler radar with the sophistication of a unique pulse sampling, magnetic drum signal storage, and cross-correlation. The heart of the system is the storage device 10, which in a typical system is a rotating magnetic drum making 180 revolutions per second. A separate synchronizing track on the storage device 10 may be used to produce a pulse with a frequency of 180 c.p.s. which is used as a reference signal throughout the system thus providing a high degree of system stability. Other fixed frequency signals needed by the various components of the system may be obtained from this 180 c.p.s. reference signal through frequency multiplication or division.

The 180 cycles per second synchronizing signal is applied to exciter 11 which gates pulses of R.F. signals from oscillator 12 to transmitter 13 in response to the synchronizing signal. Transmitter 13 produces an output of high power RF pulses in response to the input from oscillator 12 and this output is coupled through transmit-receive switch 14 to antenna 15 which has suitable directivity characteristics for the particular type operation desired.

Echo pulses containing target information are received by antenna 15 and applied through transmit-receive switch 14 to receiver 16. Receiver 16 also receives a local oscillator signal from oscillator 12 at the frequency of the transmitted RF pulses. The output of receiver 16 contains the doppler frequencies of the input thereto and is coupled to a comb filter 17 which surpresses signals between 0 and 5 c.p.s. and in a 10 c.p.s. bandwidth centered about 180 c.p.s. and the harmonics thereof up to 2 KC to eliminate the back scatter signal from the earth that exists at these frequencies. The comb filter 17 also suppresses frequencies above 2 KC.

The output of comb filter 17 is coupled to sampler 18 which samples the output of comb filter 17 with very narrow sampling pulses. These samples are then fed to storage device 10 which, as aforementioned, is typically a rotating magnetic drum making 180 revolutions per second. Storage device 10 is divided into a number of equal segments corresponding to the number of range gates in the system. A typical system has 23 such range gates. A sample is stored in each of such segments on each revolution of the drum. Since the period of revolution of the drum is approximately 5.5 milliseconds, sampler 18 should sample the output of comb filter 17 every 240 microseconds. When the sampling pulse of sampler 18 has a pulse width of 0.07 microseconds, it is possible to store approximately 3600 samples in each segment of the drum. The samples are stored side by side in each of the 23 segments of the drum by moving the input over one sampling pulse width on each revolution of the drum. It will take approximately 20 seconds to fill the storage and from then on, the oldest information is erased as new information resulting from later received signals is recorded in its place.

Readout of the 3600 samples stored in each of the 23 segments of the drum of storage device 10 is accomplished in one revolution of the drum. This results in a time compression of 82,800 as a result of which the original doppler frequencies of 5 to 90 c.p.s. are multiplied to 0.4 to 7.5 MC. The output of the storage device 10 is coupled to the analysis channels 19, which are described in detail in conjunction with description of FIGS. 2 and 3, and the output of the analysis channels 19 is coupled to the video signal inputs of the velocity vs. range display 21, acceleration vs. range display 22, and acceleration vs. velocity display 23, which are described in detail in conjunction with the description of FIGS. 4–11.

It should be noted that the aforementioned copending application, Ser. No. 285,555, describes and claims the details of the radar system of FIG. 1 from the antenna 15 to analysis channels 19. The present invention relates to the details of the system of FIG. 1 from analysis channels 19 through displays 21–23.

Figure 2:
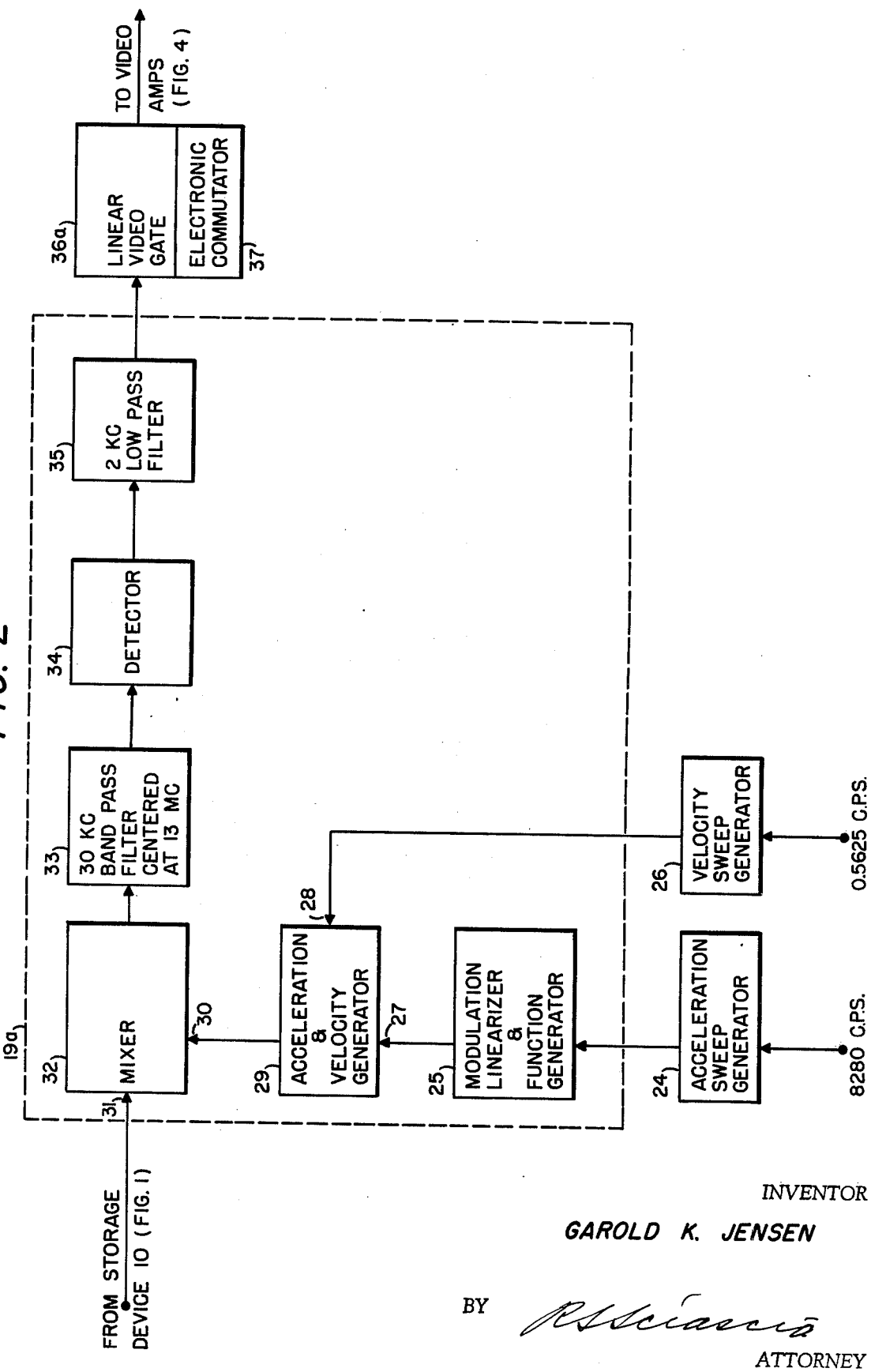
FIG. 2 illustrates the details of one channel of the analysis apparatus 19 of FIG. 1 in block diagram form.

Turning now to FIG. 2, where a typical analysis channel 19a is shown in detail. A 8280 c.p.s. signal, which may be derived from the 180 c.p.s. system reference frequency, is applied to acceleration sweep generator 24. Acceleration sweep generator 24 divides this frequency by a factor of two and applies a 4140 c.p.s. signal to modulation linearizer and function generator 25. A frequency-time description of a portion of a given missile's acceleration profile is stored in generator 25. Thus, the output signal from generator 25 is a signal containing a representation of the doppler frequency shift that a given missile will produce. This signal is applied to the first input 27 of acceleration and velocity generator 29. A 0.5625 c.p.s. signal, which also may be derived from the 180 c.p.s. system reference frequency, is applied to velocity sweep generator 26. The output of generator 26 is a 0.5625 c.p.s. signal and is coupled to the second input 28 of acceleration and velocity generator 29. Acceleration and velocity generator 29 produces a velocity sweep signal that varies from 13.4 mc to 20.5 mc during the analysis cycle of approximately 1.7 seconds and also a representation of the doppler frequency shift that a given missile will produce. This signal is applied to the first input 30 of mixer 32 where it heterodynes the output signal from storage device 10 (FIG. 1) which is applied to the second input 31 of mixer 32. One of the 320 velocity gates is sampled each revolution of the drum of storage device 10. This means that the signal applied to the first input 30 of mixer 32 will vary 22 KC approximately every 5.5 milliseconds.

If a given target has no or little acceleration, such as is the case with an airplane, frequency variation of the doppler target signal would be confined within this 22 KC. But, in the case of a target with a high acceleration, such as a missile, the doppler information received during the approximate 20 second period required to fill storage device 10 will vary much more than 22 KC as seen at the output of storage device 10 and will be smeared across many velocity gates, thereby decreasing system sensitivity unless some provision is made for confining this information to one velocity gate. The representation of the doppler frequency shift that a given missile will produce at the output of storage device 10 that is applied to the first input 30 of mixer 32 along with the velocity sweep signal that varies from 13.4 to 20.5 MC over the analysis period of approximately 1.7 seconds is responsible for confining target information to one velocity gate as a result of the heterodyning operation that is carried on in mixer 32.

The output of mixer 32 is coupled to the input of filter 33 which has a 30 KC bandpass centered at 13 MC. Since the 2 KC bandwidth of frequencies fed into storage device 10 is multiplied to a bandwidth of more than 164 MC when the drum of storage device 10 (FIG. 1) is read out in one revolution, this 30 KC bandwidth represents narrow band filtering thereby producing a substantial signal-to-noise ratio improvement. The output of filter 33 is coupled to the input of detector 34 and the detected target signals are then passed through a low pass filter 35 which has a 2KC bandwidth before being applied to linear video gate 36a. The signal applied to linear video gate 36a is sampled and passed to video amps 45, 46, and 47 (FIG. 4) in response to a sampling pulse applied to gate 36a from electronic commutator 37 which switches gate 36a from a normally relatively high impedance state to a relatively low impedance state.

Figure 3:
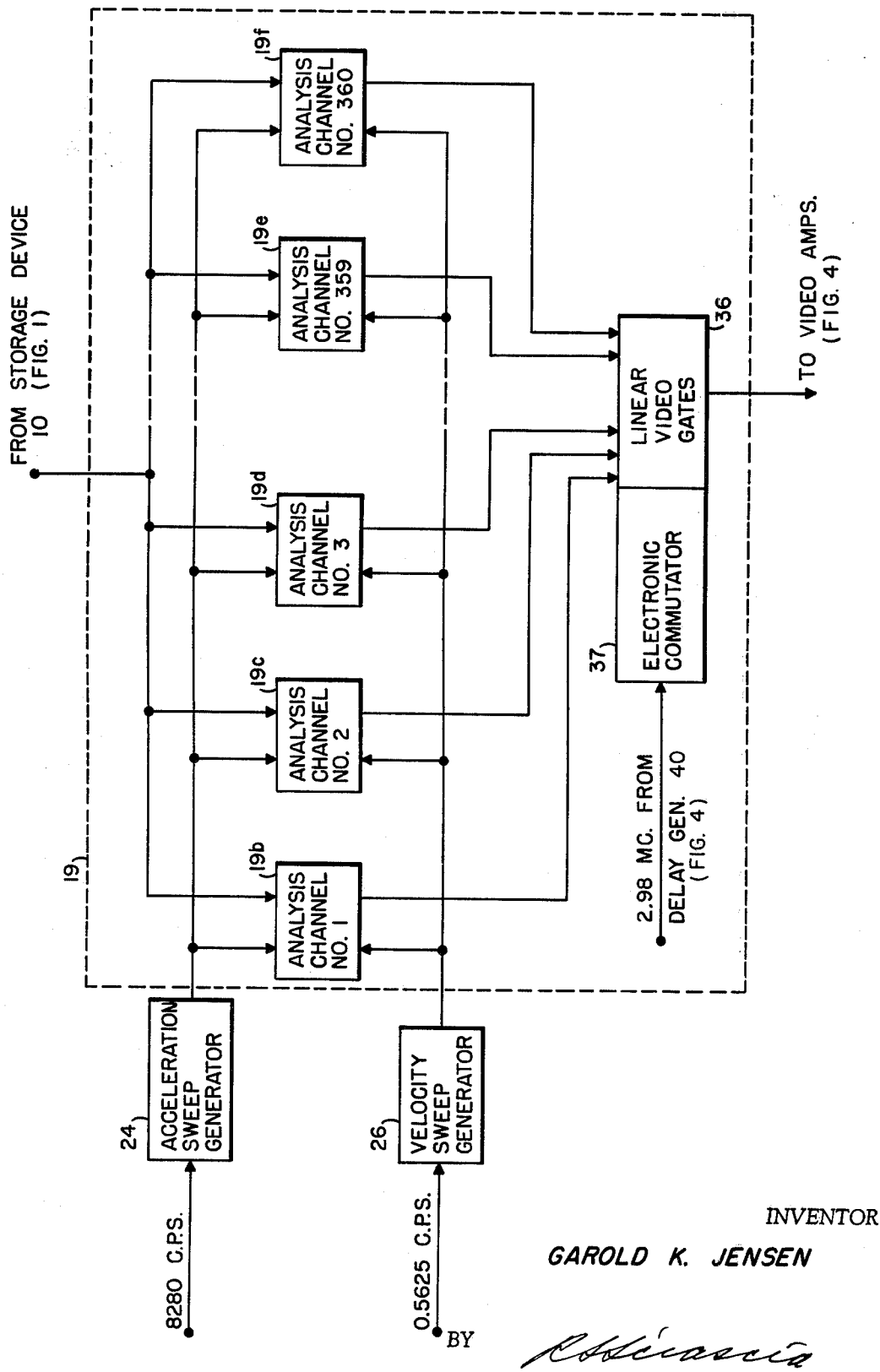
FIG. 3 shows a block diagram of the paralleled analysis channels of a cross-correlation radar designed to give range, velocity, and acceleration information for a target.

FIG. 3 shows that the analysis channels 19 of FIG. 1 are a plurality of parallel channels containing the same components and operating according to the same principle as the analysis channel 19a of FIG. 2. The only difference between analysis channels 19b–19f is that a different frequency-time description of a missile acceleration profile is stored in each channel so that the variation in doppler shift caused by a target with a high acceleration will be cancelled out in at least one of the channels 19b–19f when the target signal is heterodyned by the signal representative of the frequency-time description of a missile acceleration profile that is stored in the channel. It has been found that 360 channels, each with a different frequency-time description stored therein, provide adequate capability to match the variation in doppler shift caused by the acceleration of a target with a signal representative of the frequency-time description stored in at least one channel for most any missile that the radar may be expected to detect. A common acceleration sweep generator 24 and velocity, sweep generator may be used for all of the analysis channels 19b–19f.

Figure 4:
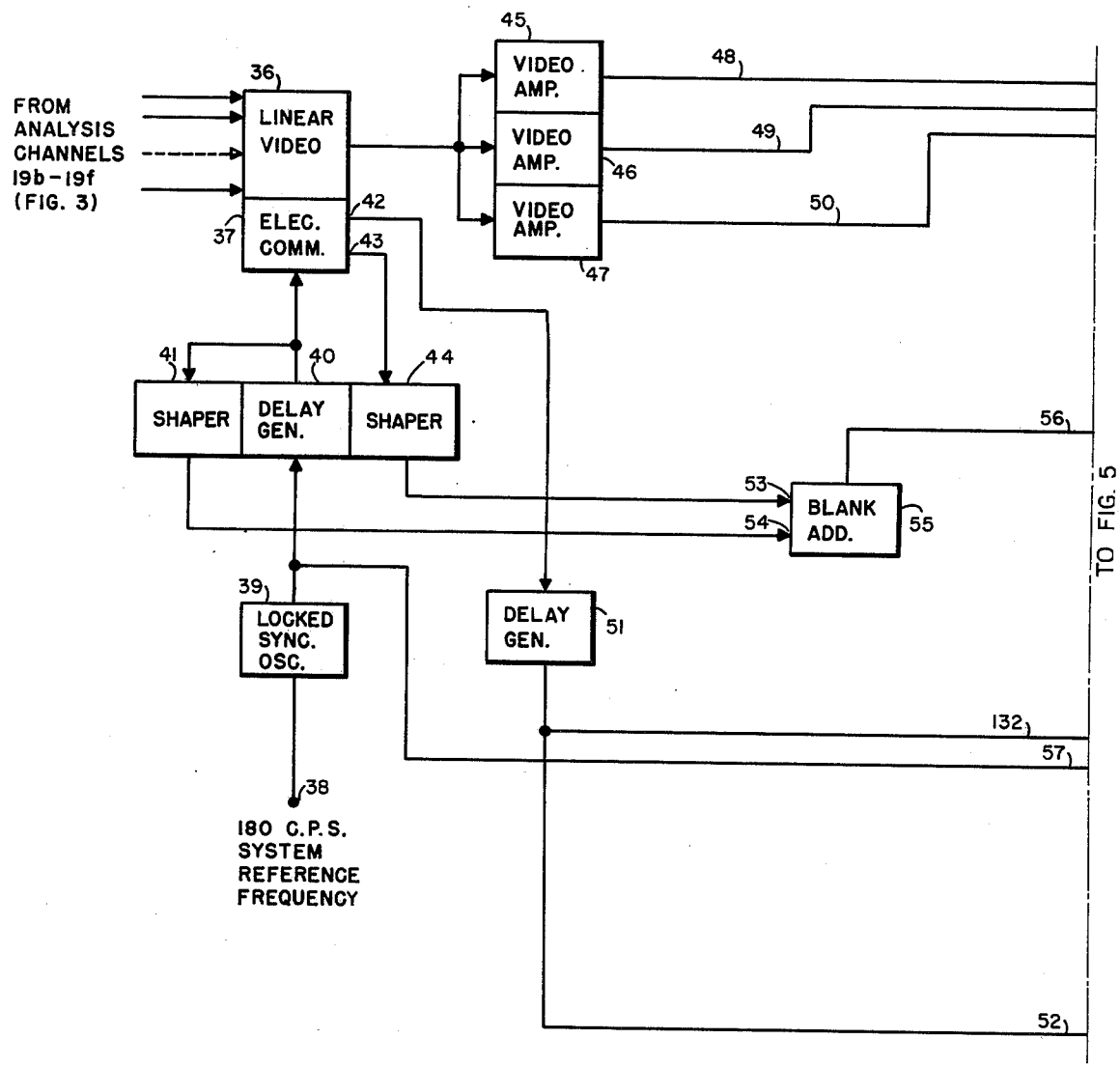

Signal output may occur simultaneously from more than one of the analysis channels. Since this information is to be displayed on cathode ray tubes which require information in sequential rather than simultaneous form, the outputs of analysis channels 19b–19f are fed to linear video gates 36. In practice, each channel is coupled to the input of a separate gate. Linear video gates 36 are sequentially switched from a normally relatively high impedance state to a relatively low impedance state once every 120 microseconds by a pulse from electronic commutator 37 which is driven by a 2.98 mc signal from delay generator 40 (FIG. 4). The output from linear video gates 36 is coupled to the inputs of video amplifiers 45, 46, and 47 (FIG. 4).

The output from the linear video gates 36 contains acceleration, velocity, and range information in sequential form. Since the 360 analysis channels are sequentially sampled once every 120 microseconds and since each analysis channel represents one acceleration gate, each 120 microsecond interval of the output from linear video gate 36 can be divided into shorter intervals of 0.333 microseconds which represents the interval during which the signal output from linear video gates 36 is attributable to a particular analysis channel or acceleration gate. A similar analysis of the operation of the system can be used to determine the interval of the signal output from linear video gates 36 which is attributable to a particular velocity gate and to a particular range gate. Such an analysis shows that each 5.5 millisecond interval of the output from linear video gates 36 over a period of 1.7 seconds, which is the approximate period of a complete analysis cycle, is attributable to the sampling of a particular one of the 320 velocity gates and that each 240 microsecond interval of the output from gates 36 over a period of 5.5 milliseconds is attributable to the sampling of a distinct one of the 23 range gates.

Turning now to FIG. 4, wherein the input to the display system that is shown in FIGS. 4–7 is illustrated, the outputs from analysis channels 19b–19f (FIG. 3) are applied as the inputs to the linear video gates 36. A signal with a frequency equal to the system reference frequency of 180 c.p.s. and which may be derived from the synchronizing track on the revolving drum of the storage device 10 (FIG. 1) is applied to input terminal 38. Locked synchronizing oscillator 39 is coupled to input terminal 38 and its output signal is a signal having a fixed frequency of approximately 2.98 MC and is coupled to the input of delay generator 40 and to a bus 57. Delay generator 40 is designed to delay this 2.98 MC signal an amount equal to the inherent delay of the horizontal and vertical deflection yokes of the cathode ray tubes used to display the signal information. This yoke delay is a result of the high frequency of the sweeps applied to the horizontal and vertical deflection circuits and in a typical system approximates 4 microseconds. The delayed 2.98 MC signal from delay generator 40 is coupled to the input of electronic commutator 37. Electronic commutator 37 sequentially switches each of the linear video gates 36 from a normally relatively high impedance state to a low impedance state once every 120 microseconds which is at a frequency of 8280 c.p.s. Since the input to electronic commutator 37 is delayed by an amount equal to the inherent yoke delay, the switching of linear video gates 36 is delayed by an amount equal to the inherent yoke delay thus compensating for the yoke delay and insuring coincidence between the sweep signal and the information applied to the intensity modulation grids of the cathode ray tubes used to display the information. The output signal from linear video gates 36, which contains delayed acceleration, velocity, and range information in sequential form as explained hereinbefore, is coupled to video amplifiers 45, 46, and 47. The signal is amplified by amplifiers 45, 46 and 47 and the amplified signals appear on leads 48, 49 and 50, respectively.

A pre-pulse, a pulse occurring before the end of the commutation cycle of 120 microseconds, with a frequency of 8280 c.p.s. is taken off electronic commutator 37 at output 42. This pre-pulse is coupled to delay generator 51 which delays it an amount sufficient to give it a zero time delay with respect to the system reference frequency signal of 180 c.p.s. The output of delay generator 51 is applied to bus 52.

At the end of each commutation cycle, electronic commutator 37 delivers a pulse with a frequency of 8280 c.p.s. to output 43. This pulse, which will be delayed by an amount equal to the delay of delay generator 40, is coupled to a pulse shaper 44 and the output of pulse shaper 44 is a delayed 8280 c.p.s. positive pulse and is coupled to the first input 53 of blanking pulse adder 55. Delay generator 40 delivers a delayed 2.98 MC signal to pulse shaper 41 and the output of pulse shaper 41 is a positive pulse with a frequency of about 2.98 MC and is coupled to the second input 54 of blanking pulse adder 55. The output of blanking pulse adder 55 contains the sum of these 2.98 MC pulses and 8280 c.p.s. pulses and is applied to bus 56.

Figure 5:
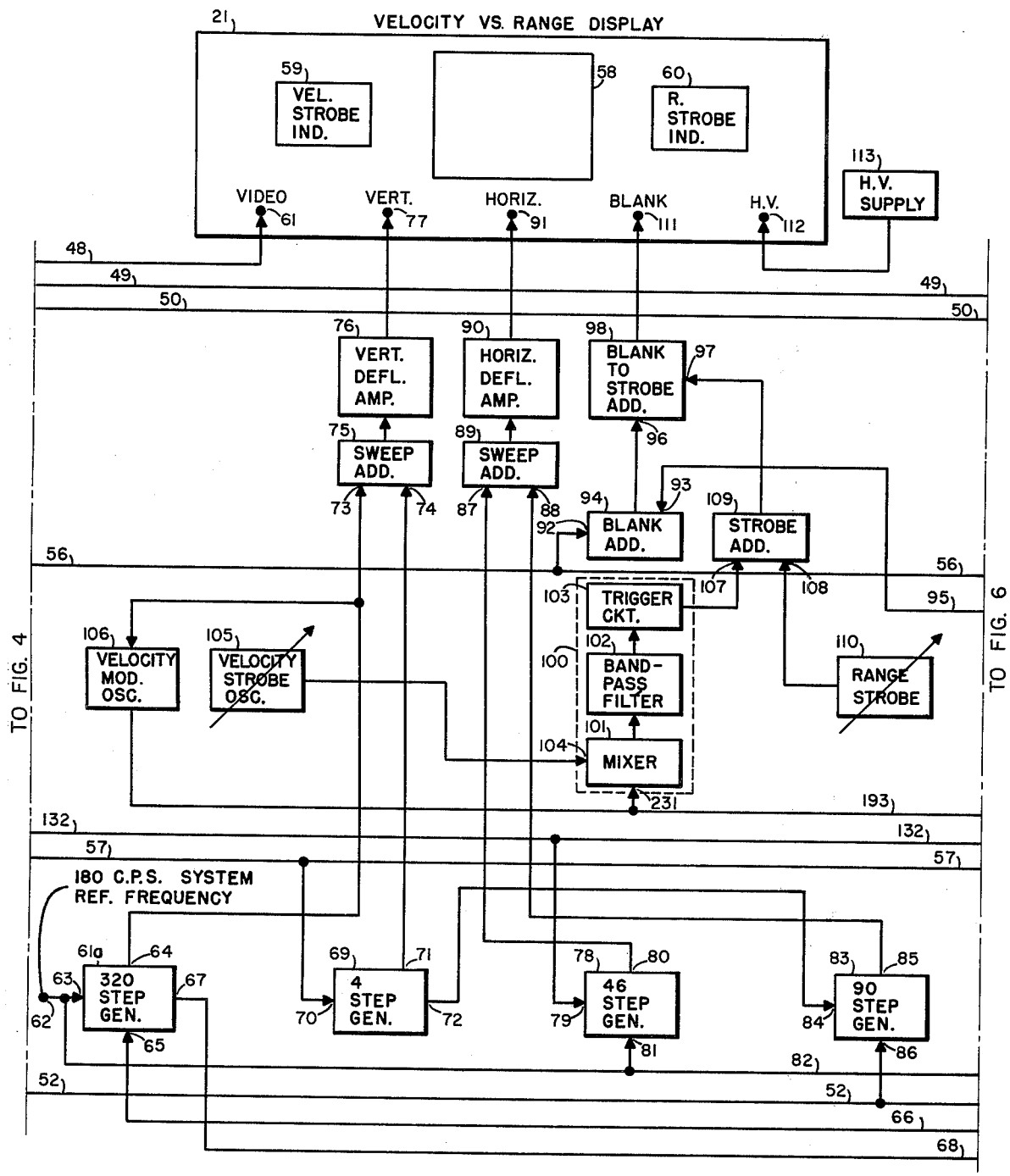

FIG. 5 illustrates the velocity vs. range display 21 of the display system wherein target velocity is displayed along the vertical axis and target range is displayed along the horizontal axis of the long persistence screen 58 of the cathode ray tube of display 21. Velocity strobe indicator 59 and range strobe indicator 60 may be digital voltmeters calibrated in terms of velocity and range respectively. Target information is to be displayed in the form of intensity modulation and, thus, lead 48, which carries the target information, is coupled to the intensity modulation grid 61 of the cathode ray tube.

Since it is desired that no two sweep lines fall on one another during the analysis cycle of approximately 1.7 seconds, the raster scan for display 21 is formed by applying main and auxiliary sweep generators to each of the vertical and horizontal deflection circuits of the display 21. Staircase generators are used to prevent smearing of the elements.

The main sweep generator 61a for the vertical deflection circuit has an input signal applied from terminal 62 to its input 63 at the system reference frequency of 180 c.p.s. This signal may be derived from the synchronizing track on the revolving drum of storage device 10 (FIG. 1). In response to this signal, sweep generator 61a develops a staircase of 320 steps, each of a duration of 5.5 milliseconds, which appears at its output 64. The repetition period of this staircase is equal to the product of the number of steps and the duration of each step or, approximately, 1.7 seconds, which is equal to the duration of a complete analysis cycle. Thus, this staircase is synchronized with reception of target velocity information from different velocity gates though leading such reception in point of time by an amount equal to the delay imparted to target information by delay generator 40 (FIG. 4). Each time generator 61a has completed generating the full 320 steps staircase, it receives a reset pulse at its external reset input 65 from bus 66 which carries a pulse train with a repetition rate of 0.5625 c.p.s. and applies a pulse from its blanking output 67 to bus 68 thereby producing a pulse train on bus 68 having a repetition rate of 0.5625 c.p.s. Generator 61a is externally reset for purposes of stability.

The auxiliary sweep generator 69 for the vertical deflection circuit of the velocity vs. range display 21 receives its input from bus 57, which has a 2.98 MC signal that is undelayed with respect to the 180 c.p.s. system reference frequency impressed thereon, at its input terminal 70. In response to this input, generator 69 produces a four step staircase at its output 71. The duration of each step is approximately 0.33 microseconds and the repetition period of each staircase is approximately 1.33 microseconds. Each time generator 69 completes generating the full 4 step staircase, it is internally reset and produces a pulse at its blanking output 72. Thus, a pulse train with a repetition rate 82800 c.p.s. appears at blanking ouput 72.

The output 64 of main sweep generator 61a is coupled to the first input 73 of sweep adder 75 and the output 71 of auxiliary sweep generator 69 is connected to the second input 74 of sweep adder 75. The output of sweep adder 75 is a composite of the staircases produced by generators 61a and 69 and is coupled through a vertical deflection amplifier 76 to the input 77 of the vertical deflection circuit of the cathode ray tube of display 21.

The main sweep generator 78 for the horizontal deflection circuit of the display 21 receives an 8280 c.p.s. signal, undelayed with respect to the system reference frequency signal, at its input 79 from bus 132. In response to this signal, it develops a 46 step staircase at its output 80 which has a repetition period of 5.5 milliseconds and each step of which has a duration of 120 microseconds. The duration of the steps is half the duration of a single range gate and the number of steps in the staircase are twice the number of range gates so that each range gate will be swept twice due to the sweep signal produced by generator 78 thus insuring detection of nonrectangular target information. The staircase produced by generator 79 is repeated in synchronization with the reception of target information from different range gates though it leads the change of range gates in point of time an amount equal to the inherent yoke delay since delay generator 40 (FIG. 4) delays target information by that amount. Generator 78 is reset every 5.5 milliseconds by a signal applied to its external reset input 81 from bus 82 which is connected to terminal 62 upon which a signal with the system reference frequency of 180 c.p.s. appears. This external reset prevents the repetition period of the staircase produced by generator 78 from changing.

The auxiliary sweep generator 83 for the horizontal deflection circuit of display 21 has its input 84 connected to the blanking output 72 of auxiliary generator 69. As aforementioned, a pulse train with a repetition rate of 82800 c.p.s. appears at output 72. Generator 83 produces a 90 step staircase at its output 85 each step of which has a duration of approximately 1.33 microseconds and the repetition period of which is 120 microseconds. Each 120 microseconds, generator 83 receives a reset pulse at its reset input 86 from bus 52 upon which an undelayed 8280 c.p.s. signal is impressed.

Output 80 of main generator 78 is coupled to the first input 87 of sweep adder 89 and output 85 of auxiliary sweep generator 83 is coupled to the second input 88 of sweep adder 89. The output of sweep adder 89 contains the sum of the staircases produced by generators 78 and 83 and is coupled through horizontal deflection amplifier 90 to the input 91 of the vertical deflection circuit of the cathode ray tube of display 21.

First and second blanking pulses having respective frequencies of approximately 2.98 MC and 8280 c.p.s. are applied from bus 56 to the first input 92 of blank adder 94 and third and fourth blanking pulses having respective frequencies of 0.5625 c.p.s. and 180 c.p.s. are applied from bus 95 to the second input 93 of blank adder 94. The output of blank adder 94 is coupled to the first input 96 of blank to strobe adder 98.

A velocity strobe signal is developed by a velocity strobe 100 which comprises a mixer 101, a bandpass filter 102, which is centered at 13 MC and has an 8 KC bandpass, and a trigger circuit 103. The first input 104 of mixer 101 is coupled to the output of velocity strobe oscillator 105, the output frequency of which is manually adjustable between 0.4 and 7.5 MC by manually controlling the voltage input to the oscillator 105. The second input 231 of mixer 101 is coupled to the output of velocity modulation oscillator 106 the input of which is coupled to the output 64 of vertical main sweep generator 61a. Velocity modulation oscillator 106 linearly sweeps from 13.4 to 20.5 MC during the analysis cycle of approximately 1.7 seconds in synchronism with the sweep of acceleration and velocity generator 29 (FIG. 2). If the output of acceleration and velocity generator 29 contained no signal representative of a particular acceleration profile or if a profile for zero acceleration were stored in modulation linearizer and function generator 25 (FIG. 2), the output of acceleration and sweep generator 29 (FIG. 2) would be the same as the output of velocity modulation oscillator 106. When the difference frequency resulting from mixing the inputs to mixer 101 falls within the 8 KC bandpass centered about 13 MC of bandpass filter 102, bandpass filter 102 will deliver a signal to trigger circuit 103. Trigger circuit 103 is designed to produce a pulse equal in duration to the approximate 5.5 millisecond analysis period of a single velocity gate in response to an input. This pulse is delivered to the first input 107 of strobe adder 109. A range strobe signal is developed by range strobe 110 and is a 240 microsecond pulse delayed with respect to an 180 c.p.s. signal by an amount sufficient to cause its production to coincide with sampling of the particular range gate of interest. This pulse may be produced by conventional phantastron circuit (not shown) with a 180 c.p.s. input and with its output being coupled to a trigger circuit (also not shown) that produces a 240 microsecond pulse in response to an input. The delay may be imparted to the production of an output from the phantastron circuit by manually adjusting the d.c. voltage that serves as the plate catching voltage for the phantastron circuit. The output of range strobe 110 is coupled to the second input 108 of strobe adder 109. The output of strobe adder 109 contains the sum of the velocity strobe pulse and the range strobe pulse and is coupled to the second input 97 of blank to strobe adder 98.

The output of blank to strobe adder 98 contains the sum of the 0.5625 c.p.s., 180 c.p.s., 8280 c.p.s., and 2.98 MC blanking pulses and of the range and velocity strobe pulses and is coupled to the blanking input 111 of display 21 which may be the cathode of the cathode ray tube of display 21. The 0.5625 c.p.s. pulse supplies blanking for reset of the vertical main sweep generator 61; the 180 c.p.s. pulse supplies blanking for the reset of the horizontal main sweep generator 78 and for the stepping of the vertical main sweep generator 61a; the 8280 c.p.s. pulse supplies blanking for the reset of the horizontal auxiliary sweep generator 83 and for the stepping of the horizontal main sweep generator 78; and the 2.98 MC pulse supplies blanking for the reset of vertical auxiliary sweep generator 69 and for the stepping of the vertical auxiliary sweep generator 69 and horizontal auxiliary sweep generator 83. The range and velocity strobe pulses brighten the intensity of screen 58 at a point determined by the adjustment of velocity strobe oscillator 105 and range strobe 110.

It should be noted that the range and velocity strobe signals could be reversed in polarity and added to the video information signal carried by lead 48 and the sum could then be applied to the intensity modulation grid 61 of the cathode ray tube of display 21. They would operate in the same way as they do when applied to the cathode of the cathode ray tube.

As before described, the velocity strobe signal is controlled by the manual adjustment of the input voltage to velocity strobe oscillator 105. Thus, the velocity coordinate of screen 58 at which the strobe signal appears is controlled by the adjustment of this input voltage. Therefore, velocity strobe indicator 59, which is a digital voltmeter calibrated in terms of velocity and which responds to the input voltage to velocity strobe oscillator 105, provides a direct reading of the velocity corresponding to the position of the strobe. Also as before described, the range strobe signal is controlled by the manual adjustment of the plate catching voltage of the phantastron circuit of range strobe 110. Accordingly, the range coordinate of screen 58 at which the strobe signal appears is controlled by the adjustment of this plate catching voltage. Therefore, range strobe indicator 60, which is a digital voltmeter calibrated in terms of range and which responds to the plate catching voltage of the phantastron circuit of range strobe 110, provides a direct reading of the range corresponding to the position of the strobe. Hence, if the strobe is adjusted on the face of screen 58 to correspond with the position of a target signal, direct readings of the velocity and range parameter of the target are available from velocity strobe indicator 59 and range strobe indicator 60.

The high voltage for the cathode ray tube of display 21 is applied to the high voltage input 112 from the high voltage supply 113.

Figure 6:
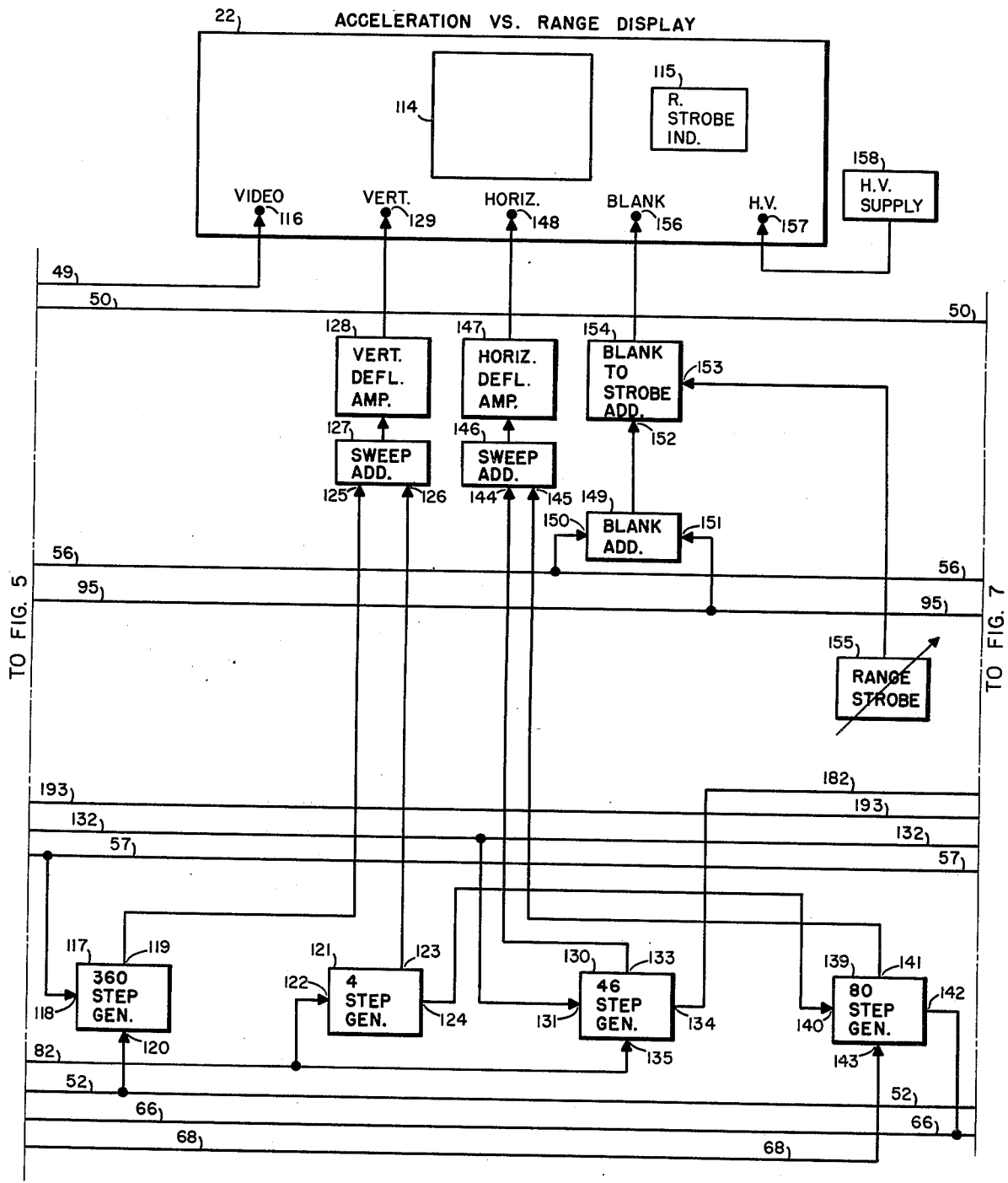

Turning now to FIG. 6 and the acceleration vs. range display 22 wherein acceleration information is displayed along the vertical axis and range information is displayed along the horizontal axis of the long persistence screen 114 of the cathode ray tube of display 22. Range strobe may be a digital voltmeter calibrated in terms of range. Lead 49 conveys target information to the intensity modulation grid 116.

As was the case with respect to display 21 (FIG. 5), the raster scan for display 22 is formed by applying main and auxiliary sweep signals to the vertical and horizontal deflection circuits of display 22. Again, these sweep signals are generated by staircase generators, as opposed to conventional sawtooth generators, to prevent smearing of the elements on the long persistence screen 114.

Vertical main sweep generator 117 has its input 118 coupled to bus 57 which carries a signal having an approximate frequency of 2.98 MC with a zero time delay with respect to the system reference frequency of 180 c.p.s. In response, generator 117 develops a 360 step staircase at its output 119. Each step of this staircase has approximately an 0.333 microsecond duration which is equal to the duration of the sampling of an individual acceleration gate and the repetition period of the staircase is 120 microseconds which equals the period over which all acceleration gates are sampled once. Thus, the signal appearing at output 119 of generator 117 is synchronized with the reception of target acceleration information by the intensity modulation grid 116 of the cathode ray tube of display 22. Generator 117 receives a reset pulse every 120 microseconds at its external reset input 120 from bus 52. External reset is employed for purposes of system stability.

Vertical auxiliary sweep generator 121 has its input 122 coupled to bus 82 which carries an 180 c.p.s. signal. In response, generator 121 develops a 4 step staircase at its output 123. Each step of the staircase has a duration of approximately 5.5 milliseconds and the repetition period of the staircase is approximately 22 milliseconds. Generator 121 also produces signal at its blanking output 124 which signal has a frequency of 4.5 c.p.s. Since there is no convenient source of reset signals for generator 121, it is internally reset. The accuracy of this internal reset bears a direct relationship to the stability of the system.

Output 119 of generator 117 is coupled to the first input 125 of sweep adder 127 and output 123 of generator 121 is coupled to the second input 126 of sweep adder 127. The sum of the outputs of generators 117 and 121 are coupled from the output of sweep adder 127 through vertical deflection amplifier 128 to the vertical deflection circuit input 129 of the cathode ray tube of display 22.

Figure 7:
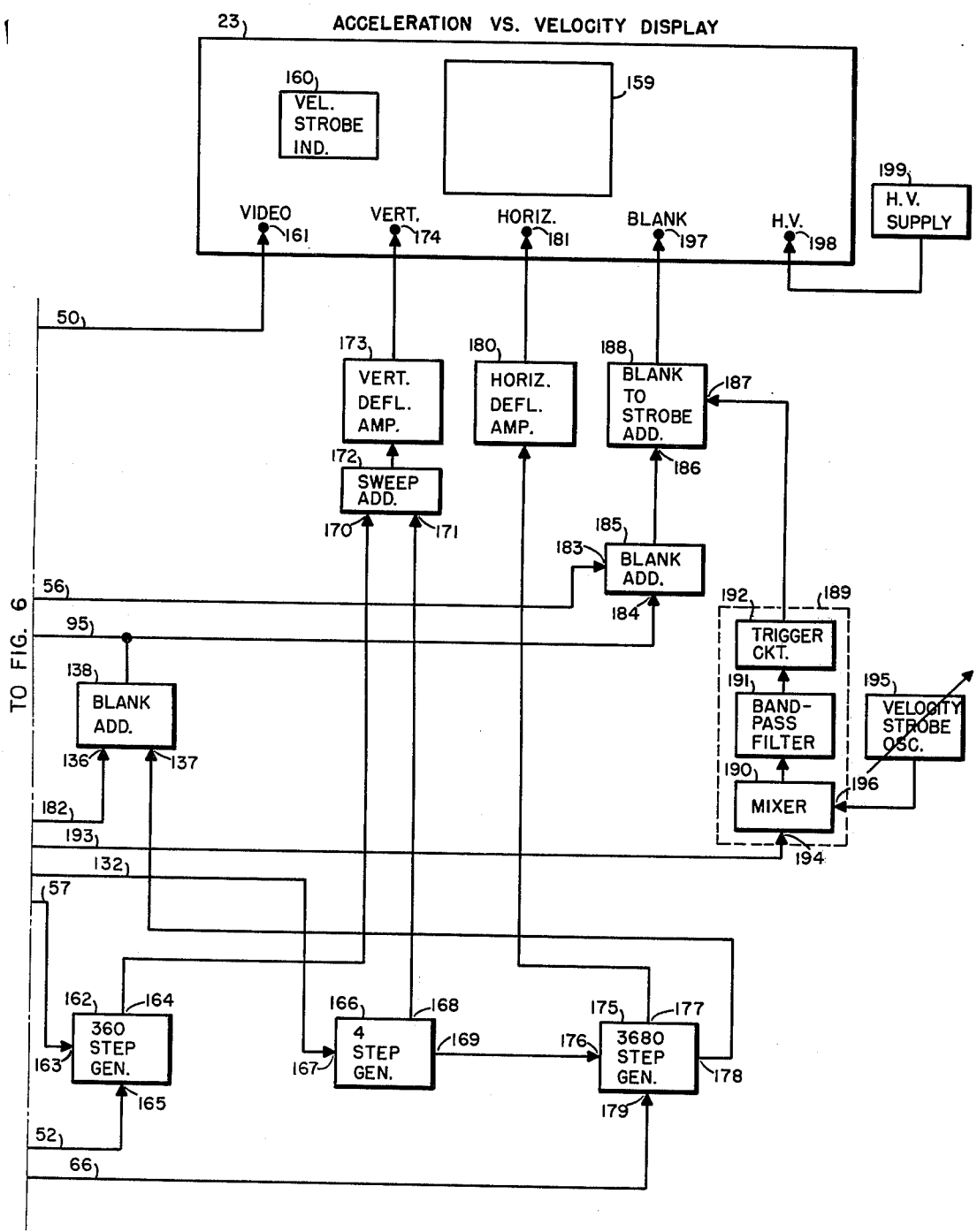

The horizontal sweep for the cathode ray tube of display 22 is developed by horizontal main sweep generator 130 and horizontal auxiliary sweep generator 139. Generator 130 receives an 8280 c.p.s. signal at its input 131 from bus 132 which is coupled to bus 52 (FIG. 5). This signal has zero time delay with respect to the system reference frequency signal of 180 c.p.s. In response, horizontal main sweep generator 130 produces a 46 step staircase signal at its output 133; the duration of each step of which is 120 microseconds, which is half the 240 microsecond period over which a single range gate is sampled, and the repetition period of the generator 130 is 5.5 milliseconds, which is the time over which each of the range gates are sampled twice. Thus, generator 130 produces two sweep signals during the sampling of each range gate thereby insuring display of nonrectangular target pulses. Generator 130 also produces a signal that appears at its blanking pulse output 134 which is a series of positive pulses having a frequency of 180 c.p.s. This signal is coupled by lead 182 to the first input 136 of blanking pulse adder 138 (FIG. 7). External reset signals for generator 130 are provided for purposes of system stability and are applied to external reset input 135 from bus 82 which carries an 180 c.p.s. signal.

Horizontal auxiliary sweep generator 139 receives a 4.5 c.p.s. signal at its input 140 from the blanking output 124 of vertical auxiliary sweep generator 121. In response, generator 139 produces an 80 step staircase each step of which has a duration of approximately 22 milliseconds and the repetition period of which is approximately 1.7 seconds which is the time lapse for a total analysis cycle. Generator 139 also produces a 0.5625 c.p.s. signal at its blanking output 142 which is fed to bus 66. Generator 139 is externally reset for purposes of stability by a 0.5625 c.p.s. signal applied to its reset input terminal 143 from bus 68.

The output 133 of generator 130 is coupled to the first input 144 of sweep adder 146 and the output 141 of generator 139 is coupled to the second input 145 of sweep adder 146. The sum of the outputs of generator 133 and 141 is coupled from the output of sweep adder 146 through horizontal deflection amplifier 147 to the input 148 of the horizontal deflection circuit of the cathode ray tube of display 22.

Blanking pulse adder 149 has its first input 150 coupled to bus 56 which carries 2.98 MC and 8280 c.p.s. blanking pulses. These pulses are delayed with respect to the sweep pulses applied to the inputs 129 and 148 of the vertical and horizontal deflection circuits of the cathode ray tube of display 22 by an amount equal to the delay of delay generator 40 (FIG. 4) which is set to be equal to the inherent yoke delay of the vertical and horizontal deflection circuits. The second input 151 of blanking pulse adder is coupled to bus 95 which carries blanking pulses having frequencies of 0.5625 c.p.s. and 180 c.p.s. These blanking pulses are not delayed in time with respect to the system reference signal of 180 c.p.s. or the sweep pulses applied to the input 129 of the vertical deflection circuit and the input 148 of the vertical deflection circuit of the cathode ray tube of display 22. No delay is necessary since the inherent yoke delay, which is typically 4 microseconds, is so small when compared to the respective 1.7 second and 5.5 milliseconds repetition period of these pulses. Blanking pulse adder 149 applies the sum of these 0.5625 c.p.s., 180 c.p.s., 8280 c.p.s., and 2.98 MC blanking pulses to the first input 152 of blank to strobe adder 154.

Range strobe 155 develops 240 microsecond strobe signals in the same manner as described in conjunction with range strobe 110 (FIG. 5). These pulses are applied to the second input 153 of blank to strobe adder 154 wherein they are added to the blanking pulses applied to the first input 152. The output of blank to strobe adder 154 is coupled to the blanking circuit input 156 of the cathode ray tube of display 22. Typically, the blanking circuit input may be the cathode of the cathode ray tube. The 0.5625 c.p.s. blanking pulse provides blanking for the reset of the horizontal auxiliary sweep generator 139; the 180 c.p.s. pulse supplies blanking for the reset of the vertical auxiliary sweep generator 121 and the horizontal main sweep generator 130 and for the stepping of the vertical auxiliary sweep generator 121 and of the horizontal auxiliary sweep generator 139; the 8280 c.p.s. pulse supplies blanking for the reset of the vertical main sweep generator 117 and for the stepping of the horizontal main sweep generator 130; and the 2.98 MC signal supplies blanking for the stepping of the vertical main sweep generator 117. The range strobe pulse controls the position of the strobe signal on the screen 114 of display 22 and the range strobe indicator 115 provides a direct reading in terms of the range corresponding to the position of the strobe in the same manner as described in conjunction with the description of the range strobe 110 and range strobe indicator 60 of FIG. 5.

It should be noted that the range strobe signal could be reversed in polarity and added to the video signal carried by lead 49 and applied to the intensity modulation grid 116 of the cathode ray tube of display 22.

The high voltage for the cathode ray tube of display 22 is applied to the high voltage input 157 from high voltage supply 158.

With reference now to FIG. 7 and the acceleration vs. velocity display 23 wherein acceleration information is displayed along the vertical axis and velocity information is displayed along the horizontal axis of the long persistence screen 159 of the cathode ray tube of display 23. Velocity strobe indicator 160 may be a digital voltmeter calibrated in terms of velocity.

Target information is conveyed to the intensity modulation grid 161 by lead 50. As in the displays of FIGS. 5 and 6, the sweep signals are produced by staircase generators. The raster scan for display 23 is formed by applying main and auxiliary sweep signals to the vertical deflection circuit in the same manner as in FIGS. 5 and 6, but, unlike the displays of FIGS. 5 and 6, only main sweep signals are applied to the horizontal deflection circuit. Due to the particular way the display 23 is swept, the duration of each step applied to the horizontal deflection circuit is at least as long as the repetition periods of the staircases produced by the main and auxiliary vertical sweep generators and, thus, a horizontal auxiliary sweep generator is not required.

Vertical main sweep generator 162 has its input 163 coupled to bus 57 which carries a signal having a frequency of approximately 2.98 MC and having a zero time delay with respect to the 180 c.p.s. system reference frequency signal. In response to this input, generator 162 develops a staircase having 360 steps at its output 164. Each step of the staircase has a duration of approximately 0.33 microseconds, which equals the duration of sampling of a single acceleration gate, and the repetition period of the staircase is 120 microseconds, which equals the period over which each acceleration gate is sampled once. Thus, the sweep signals developed by generator 162 are synchronized with the reception of target acceleration information at the intensity modulation grid 161 of the cathode ray tube of display 23 though leading such reception in point of time by an amount equal to the inherent yoke delay in the vertical deflection circuit of the cathode ray tube. Generator 162 is externally reset for purposes of system stability by an 8.28 KC signal applied to its external reset input 165 from bus 52. This reset signal also has a zero time delay with respect to the system reference frequency signal.

Vertical auxiliary sweep generator 166 receives an 8280 c.p.s. signal at its input 167 from bus 132. This signal has a zero time delay with respect to the 180 c.p.s. system reference frequency signal. In response, generator 166 produces a 4 step staircase at its output 168 and a signal at its blanking output 169 having an approximate frequency of 2070 c.p.s. Each step of the 4 step staircase produced at the output 168 of generator 166 has a duration of approximately 120 microseconds and the repetition period of the staircase is about 480 microseconds. Generator 166 is internally reset.

The output 164 of vertical main sweep generator 162 is coupled to the first input 170 of sweep adder 172 and the output 168 of vertical auxiliary sweep generator 166 is coupled to the second input 171 of sweep adder 172. The sum of the staircase signals is coupled from the output of sweep adder 172, through the vertical deflection amplifier 173, to the input 174 of the vertical deflection circuit of the cathode ray tube of display 23.

Horizontal sweep signals are developed by horizontal sweep generator 175. The input 176 of generator 175 receives a signal having an approximate frequency of 2070 c.p.s. from the blanking output 169 of vertical auxiliary sweep generator 166. In response to this input, generator 175 produces a 3680 step staircase signal at its output 177 each step of which has a duration of approximately 480 microseconds and the repetition period of which is approximately 1.7 seconds which is equal to the time elapse of a complete analysis cycle and to the time during which each velocity gate is sampled once. This signal is coupled from the output 177 of generator 175, through horizontal deflection amplifier 180, to the input 181 to the horizontal deflection circuit of the cathode ray tube of display 23.

Generator 175 also produces an 0.5625 c.p.s. positive pulse signal at its blanking pulse output 178 which is coupled to the second input 137 of blanking pulse adder 138. This signal is added to the 180 c.p.s. signal applied to the first input 136 of blanking pulse adder 138 by lead 182 which is coupled to the blanking pulse output 134 of the horizontal main sweep generator 130 for display 22 (FIG. 6) and the output of blanking pulse adder 138 is coupled to bus 95 and applies the 0.5625 c.p.s. and 180 c.p.s. blanking pulses to bus 95.

Generator 175 receives an 0.5625 c.p.s. reset signal from bus 66 at its external reset input 179. As is the case with the other externally reset generators of the system, generator 175 is externally reset for purposes of stability.

The 8280 c.p.s. and 2.98 MC blanking pulses carried by bus 56 are applied to the first input 183 of blanking pulse adder 185 and the 0.5625 c.p.s. and 180 c.p.s. blanking pulses carried by bus 95 are applied to the second input 184 of blanking pulse adder 185. The output of blanking pulse adder 185 contains the sum of the 0.5625 c.p.s., 180 c.p.s., 8280 c.p.s. and 2.98 MC blanking pulses and is coupled to the first input 186 of blank to strobe adder 188.

The second input 187 of blank to strobe adder 188 receives a velocity strobe signal from velocity strobe 189 which contains a mixer 190, a bandpass filter 191 having a 8 KC bandpass centered at 13 MC, and a trigger circuit 192 which produces a pulse having a 5.5 millisecond duration in response to an input. Bus 193 is coupled to the output of velocity modulation oscillator 106 (FIG. 5) and applies a signal that is linearly swept from 13.4 MC to 20.5 MC to the first input 194 of mixer 190. Velocity strobe oscillator 195, the output frequency of which is varied between 0.4 MC and 7.5 MC by manually adjusting the input voltage thereto in the same manner as the output frequency of velocity strobe oscillator 105 (FIG. 5) is controlled, is coupled to the second input 196 of mixer 190. Bandpass filter 191 passes an input signal to trigger circuit 192 when the difference frequency resulting from the mixing of the inputs to mixer 190 falls within its 8 KC bandpass that is centered at 13 MC. In response to an input, trigger circuit 192 develops a strobe pulse having approximately a 5.5 milliseconds duration which is equal to the period during which a single velocity gate is sampled. The production of the strobe pulse may be controlled to correspond with the sampling of a particular velocity gate by manually adjusting the input voltage to velocity strobe oscillator 195 in the same manner as is described in conjunction with the description of velocity strobe 100 and velocity strobe oscillator 105 of FIG. 5. The strobe pulse appearing at the output of trigger circuit 192 is coupled to the second input 187 of blank to strobe adder 188.

The output of blank to strobe adder 188 contains the sum of the 0.5625 c.p.s., 180 c.p.s., 8280 c.p.s., and 2.98 MC blanking pulses that are applied to its first input 186 and the velocity strobe pulse having a duration of approximately 5.5 milliseconds that is applied to its second input 187 and is coupled to the blanking circuit input 197 which may be the cathode of the cathode ray tube of display 23. The 0.5625 c.p.s. pulse supplies blanking for the reset of horizontal sweep generator 175; the 8280 c.p.s. provides blanking for the reset of the vertical main sweep generator 162 and of the vertical auxiliary sweep generator 166 and for the stepping of the vertical auxiliary sweep generator 166 and of the horizontal sweep generator 175; and the 2.98 MC pulse provides blanking for the stepping of the vertical main sweep generator 162. The velocity strobe pulse controls the position of the strobe signal on the screen 159 of display 23 and the velocity strobe indicator 160 provides a direct reading in terms of the velocity corresponding to the position of the strobe by responding to the input voltage to velocity strobe oscillator 195 in the same manner as velocity strobe indicator 59 responds to the input voltage to velocity strobe oscillator 105 (FIG. 5).

The high voltage for the cathode ray tube of display 23 is applied to the high voltage input 198 from the high voltage supply 199.

FIGS. 8–11 illustrate the manner in which velocity vs. range display 21 (FIG. 5) is swept and are useful in understanding the manner in which acceleration vs. range display 22 (FIG. 6) and acceleration vs. velocity display 23 (FIG. 7) are swept.

FIG. 8 shows the output waveform of horizontal auxiliary sweep generator 83 (FIG. 5) above the output waveform of vertical auxiliary sweep generator 69 (also FIG. 5). These waveforms have a common time axis. Therefore, FIG. 8 is representative of the time relationship between the output waveforms of the vertical and horizontal auxiliary sweep generators, 69 and 83, respectively, of FIG. 5. As can be seen, the repetition period of the 4 step staircase produced by generator 69 is equal to the duration of each step of the 90 step staircase produced by generator 83. Thus, 4 step staircase 201 corresponds with the first step 202 of the 90 step staircase. Then, as the output of 90 step generator 83 is stepped up to the second step 203, generator 69 is reset and thereafter produces the second 4 step staircase 204. This process goes on until generator 69 produces the ninetieth 4 step staircase 205 during the duration of the ninetieth step 206 of the 90 step staircase produced by generator 83. Then, generator 83 is reset and produces the first step 207 of the second 90 step staircase while generator 69 produces the ninety-first 4 step staircase 208. Generators 69 and 83 continue to produce their respective waveforms in the same time relation to one another.

FIG. 9 shows the time relationship between the output waveforms of horizontal main sweep generator 78 and of horizontal auxiliary sweep generator 83 (both of FIG. 5). The common time axis of FIG. 9 is compressed by a factor of 90 with respect to the time axis of FIG. 8. The repetition period of the 90 step staircase produced by generator 83 is equal to the duration of a step of the 46 step staircase produced by generator 78. Therefore, the first 90 step staircase 209 is produced by generator 83 during the duration of the first step 210 of the 46 step staircase produced by generator 78. After generator 83 produces the forty-sixth 90 step staircase 211 while generator 78 is producing the 46th step 212 of the first 46 step staircase, generators 78 and 83 are reset and thereafter, generator 83 produces the forth-seventh 90 step staircase 213 while generator 78 produces the first step 214 of the second 46 step staircase. The outputs of generators 78 and 83 retain this time relationship to one another while the system is in operation.

The time relationship between the output waveforms of the vertical main sweep generator 61a and horizontal main sweep generator 78 (both of FIG. 5) is illustrated in FIG. 10. The time axis of FIG. 10 is compressed by a factor of 46 with respect to the time axis of FIG. 9 and by a factor of 4140 with respect to the time axis of FIG. 8. Since the repetition period of the 46 step staircase produced by generator 78 is equal to the duration of a step of the 320 step staircase generated by generator 61a, generator 78 produces a full 46 step staircase 215 during the duration of a single step 216 of the 320 step staircase produced by generator 61a. After generator 78 produces the three hundred twentieth 46 step staircase 217 while generator 61a is generating the 320th step 218 of the first 320 step staircase, generators 61 and 78 are reset and, thereafter, generator 78 produces the three hundred twenty-first 46 step staircase 219 while generator 61a is producing the first step 220 of the second 320 step staircase. Generators 61a and 78 maintain this time relationship while the system is in operation.

FIG. 11 is a view of screen 58 of velocity vs. range display 21 and shows how the raster scan for display 21 is formed. The scan starts in the lower left-hand corner of screen 58 at the beginning of the analysis cycle of approximately 1.7 seconds and proceeds to sweep out screen 58 so that it is in the upper righthand corner thereof by the end of the analysis cycle.

More particularly, the sweep appears at points 221–224 in response to the first 4 step staircase produced by vertical auxiliary sweep generator 69 (FIG. 5) during the analysis cycle. The voltage magnitude of each step should be sufficient to vertically deflect the beam by an amount equal to at least one resolution element of the screen 58. As can be seen from FIG. 8, horizontal auxiliary sweep generator 83 (FIG. 5) generates a new step in its 90 step staircase each time generator 69 starts to generate a new 4 step staircase and the duration of each step in the staircase produced by generator 83 is equal to the repetition period of the staircase produced by generator 69. Thus, after appearing at 224 on screen 58, the sweep appears at 225 in response to the application to the horizontal deflection circuit input 91 of a new step in the 90 step staircase generated by generator 83 and to the application to the vertical deflection circuit input 77 of the first step in the next 4 step staircase produced by generator 69. The voltage magnitude of each step produced by generator 83 should be sufficient to horizontally deflect the beam by an amount equal to at least one resolution element of the screen 58 so that screen 58 may resolve signals produced at different instances which might be from different targets.

Generator 83 continues to generate a step in its 90 step staircase each time generator 69 begins to produce a new 4 step staircase until generator 83 has produced its full 90 step staircase. Then, as can be seen from FIGS. 8 and 9, considered together, after the sweep appears at point 226 on screen 58 in response to the ninetieth step of the 90 step staircase produced by generator 83 and fourth step of the 4 step staircase produced by generator 69, generators 69 and 83 reset and horizontal main sweep generator 78 (FIG. 5) produces a step in its 46 step staircase. The voltage magnitude of this step should at least be equal to the sum of the voltage magnitudes of the 90 steps produced by generator 83 so that the sweep will appear at 227 in response to the application of the new step in the 46 step staircase produced by generator 78 plus the first step in the 90 step staircase produced by generator 83 to the horizontal deflection circuit input 91 and the application of the first step in the 4 step staircase produced by generator 69.

Screen 58 will continue to be swept in this manner until the sweep appears at point 228 at the end of the 46th step of the 46 step staircase produced by generator 78. Generators 69, 78, and 83 will then all reset as can be seen from FIGS. 8 and 9 and vertical main sweep generator 61a will produce a step in its 320 step staircase as can be seen from FIG. 10. The voltage magnitude of each step of the 320 step staircase should at least be equal to the sum of the voltage magnitudes of the steps of the 4 step staircase. Thus, after appearing at point 228, the sweep will appear at 229. Thereafter, screen 58 is swept out in the same manner as described until the sweep appears at point 230 at the end of the last step of the 320 step staircase of generator 61a. Approximately 1.7 seconds, the duration of the analysis cycle, elapses between the time the sweep appears at point 221 and the time it appears at point 230. After the sweep appears at point 230, generators 61a, 69, 78 and 83 reset and the process of sweeping out screen 58 is repeated.

As is apparent, no sweep line repeats on a previous sweep line during the entire analysis cycle of approximately 1.7 seconds. Thus, the signal-to-noise ratio is not degraded in displaying the information.

The manner in which the raster scan for acceleration vs. range display 22 (FIG. 6) is formed, can be determined by considering the voltage and time relationships of the sweep signals applied thereto. Vertical main sweep generator 117 produces a 360 step staircase that has a repetition period equal to the duration of each step of the 46 step staircase produced by horizontal main sweep generator 130. The voltage magnitude of the individual steps of the 360 and 46 step staircase should be sufficient to deflect the beam at least 4 and 80 resolution elements on screen 114, respectively. The repetition period of the 46 step staircase produced by generator 130 is equal to the duration of each step of the 4 step staircase produced by vertical auxiliary sweep generator 121. The voltage magnitude of each step produced by generator 121 should be at least equal to the sum magnitudes necessary to deflect the beam vertically ¼ the number of resolution elements that it is deflected by each step from generator 117 thereby insuring that sweeps will not repeat on one another when generator 130 resets. The repetition rate of the 4 step staircase produced by generator 121 is equal to the duration of each step of the 80 step staircase generated by horizontal auxiliary sweep generator 139 and the repetition rate of the 80 step staircase produced by generator 139 is equal to the duration of the analysis cycle which is approximately 1.7 seconds. Each step of the staircase produced by generator 139 should have a voltage magnitude equal to the voltage magnitude necessary to deflect the beam horizontally 1/80 the number of elements that it is deflected by each step from generator 130, thereby insuring that no sweep will repeat on a previous sweep during the complete analysis so that target signals appearing at different instances can be resolved.

The manner in which the raster scan for acceleration vs. velocity display 23 (FIG. 7) is formed can be determined by an analysis similar to that given above for the velocity vs. range display 21 (FIG. 5) and acceleration vs. range display 22 (FIG. 6). Vertical main sweep generator 162 produces a 360 step staircase having a repetition period equal to the duration of each step of the 4 step staircase produced by vertical auxiliary sweep generator 166. The voltage magnitude of each step of the 360 step staircase generated by generator 162 should be sufficient to deflect the beam by an amount at least equal to four resolution elements of the screen 159 and the voltage magnitude of each step of the 4 step staircase produced by generator 166 should be equal to the signals necessary to deflect the beam ¼ the numbers of resolution elements that it is deflected by each step from generator 162. Horizontal sweep generator 175 produces a 3680 step staircase having a repetition period equal to the analysis cycle of approximately 1.7 seconds and each step of which has a duration equal to the repetition period of the 4 step staircase produced by generator 166. Thus, no sweep line will fall on a previous sweep line during the analysis cycle of approximately 1.7 seconds.

Thus it can be seen that the instant invention provides a stable display system wherein the degradation of the signal-to-noise ratio of the information that is incurred in displaying it is minimized and wherein the efficient use of the available capacity of a cathode ray tube may be maximized.

It should be understood that the specific examples of the system parameters comprising rate of flow of information to the display system, delay imparted to the information, number of steps in the staircases produced by the sweep generators, duration of such steps, repetition period of such staircase, frequency of the various blanking pulses, frequency and duration of the strobe pulses and other specific numerical examples are given by way of illustration and not limitation.

Obviously many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A display system for multi-dimensional information comprising:
   display means having an input, horizontal deflection circuit, and vertical deflection circuit;
   means for applying information having at least first and second dimensions to said input, said first dimension of said information having a first frequency, said second dimension of said information having a second frequency;
   means for applying a first sweep signal to one of said deflection circuits, said first sweep signal having a frequency equal to a multiple of said first frequency;
   means for applying a second sweep signal to said one deflection circuit, said second sweep signal having a frequency different from the frequency of said first sweep signal; and means for applying a third sweep signal to the other of said deflection circuits, said third sweep signal having a frequency equal to a multiple of said second frequency.

2. The display system of claim 1 further including means for applying a fourth sweep signal to said other deflection circuit, the frequency of said fourth sweep signal being different from the frequency of said third sweep signal.

3. An information display system comprising:
   display means having an input, horizontal deflection circuit and vertical deflection circuit;
   means for applying a first sweep signal having a first frequency to said horizontal deflection circuit;
   means for applying a second sweep signal having a second frequency to said vertical deflection circuit;
   at least one of said deflection circuits including means causing a first time delay between the application of a sweep signal to said circuit and the production on said display of a sweep line corresponding to said sweep signal;
   information receiving means;
   delay means;
   said information receiving means being coupled to said input through said delay means;
   said delay means delaying said information an amount substantially equal to said first time delay thereby compensating for said first time delay.

4. The display system of claim 3 further including means for applying a third sweep signal to one of said deflection circuits, said third sweep signal having a third frequency, said third frequency being different from said first and second frequencies.

5. An information display system comprising:
   display means having an input, horizontal deflection circuit, and vertical deflection circuit;
   means receiving a plurality of information samples;
   means for applying said information samples to said input, each of said samples having a substantially constant duration;
   means for applying a first sweep signal having a plurality of steps to one of said deflection circuits, each of said steps of said first sweep signal having a constant duration substantially equal to the duration of each of said information samples;
   means for applying a second sweep signal having a plurality of steps to said one deflection circuit, each of said steps of said second sweep signal having a constant duration different from the constant duration of each of said steps of said first sweep signal; and
   means for applying a third sweep signal having a plurality of steps to the other of said deflection circuits, each of said steps of said third sweep signal having a constant duration.

6. The information display system of claim 5 further including means for applying a fourth sweep signal having a plurality of steps to said other deflection circuit, each of said steps of said fourth sweep signal having a constant duration different from the constant duration of each of said steps of said third sweep signal.

7. The information display system of claim 5 further including:
   means within at least one of said deflection circuits for causing a first time delay between the application of a sweep signal to said circuit and the production of a sweep line on said display corresponding to said sweep signal; and
   delay means connected between said means receiving a plurality of information samples and said input, said delay means delaying said information samples an amount substantially equal to said first time delay thereby compensating for said first time delay.

8. A display system for multi-dimensional information comprising:
   display means having an input, horizontal deflection circuit, and vertical deflection circuit;
   information carrying means;
   means for impressing signals representative of at least first and second dimensions of the information on said information carrying means;
   first analysis means coupled to said information carrying means for detecting signals having a first finite range of values and being representative of said first dimension of said information;
   said first analysis means examining said information for signals in sequential increments of said first range of values;
   said information being examined for signals in each increment of said first range of values for a first time duration and the examination of said information for signals throughout said first range repeating with a first constant period;
   means coupling the signals detected by said first analysis means to said display means input;
   second analysis means coupled to said information carrying means for detecting signals having a second finite range of values and being representative of said second dimension of said information;
   said second analysis means examining said information for signals in sequential increments of said second range of values;
   said information being examined for signals in each increment of said second range for a second time duration and the examination of said information for signals throughout said second range repeating with a second constant period;
   means coupling the signals detected by said second analysis means to said display means input;
   means for applying a first staircase sweep signal to one of said deflection circuits, said first staircase sweep signal having a plurality of steps and a first fixed repetition period, each of said steps having a substantially constant duration;
   means for applying a second staircase sweep signal to said one deflection circuit, said second staircase sweep signal having a plurality of steps and a second fixed repetition period different from said first fixed repetition period, each of said steps having a substantially constant duration different from the duration of the steps of the first staircase sweep signal;
   means for applying a third staircase sweep signal to the other of said deflection circuits, said third staircase sweep signal having a plurality of steps and a third fixed repetition period, each of said steps having a substantially constant duration;
   said first time duration being substantially equal to a multiple of the duration of each of the steps in said first staircase sweep signal and said first constant period being substantially equal to a multiple of the repetition period of said first staircase sweep signal;

said second time duration being substantially equal to a multiple of the duration of each of the steps in said third staircase sweep signal and said second constant period being substantially equal to a multiple of the repetition period of said third staircase sweep signal.

9. The display system of claim 8 further including:

means within at least one of said deflection circuits for causing a time delay between the application of a sweep line corresponding to said sweep signal on said display; and delay means coupled to said display means input and having the signals applied to said display means input passing therethrough, said delay means delaying the reception of said signals at said input by an amount substantially equal to said time delay thereby compensating for said time delay.

10. The display system of claim 8 wherein said first analysis means includes:

signal storage means having a plurality of storage segments;

each of said segments having signals with values falling into a single increment of said range of values read therein; and means for sequentially reading out the signals stored in said plurality of storage segments, said means taking said first time duration to read out a single one of said segments.

11. The display system of claim 10 wherein said second analysis means comprises:

a plurality of parallel paths, each having an input and an output terminal;

each of said paths including a mixer, bandpass filter, detector, and gate connected in series in the order named between said input and output terminals;

said information being applied to the input terminal of each of said paths;

each of said mixers having first and second inputs and an output;

said first input being coupled to said input terminal;

means coupling a signal having a unique time varying frequency characteristic to said second input, said time varying frequency characteristic being repeated with said second constant period;

means sequentially switching said gates thereby coupling the signal applied to the input of said gates to said output terminal, each of said gates coupling the signal applied to the gate input to said output terminal for a period equal to said second time duration.

12. The display system of claim 8 wherein said first analysis means includes:

a mixer having first and second inputs and an output;

means applying said information to said first input;

means applying an oscillating signal to said second input, the frequency of said oscillating signal linearly varying with time through a range between first and second frequency limits in synchronism with said first constant period, said frequency of said oscillating signal varying over an increment of said range between said first and second limits during said first time duration;

bandpass filter means connected to the output of said mixer to pass the output signal of said mixer when the frequency of said output signal falls within the pass band of said filter; and detector means coupled to the output of said bandpass filter.

13. A display system for three dimensional information comprising:

first, second, and third display means;

each of said display means having an input, horizontal deflection circuit, and vertical deflection circuit;

information carrying means;

means for impressing three dimensional information on said information carrying means;

said information carrying means being coupled to first analysis means;

said first analysis means detecting signals having a first finite range of values and being representative of a first dimension of said information;

said first analysis means examining said information for signals in sequential increments of said first range of values;

said information being examined for signals in each increment of said first range of values for a first time duration and the examination of said information throughout said first range repeating with a first constant period;

means coupling the signals detected by said first analysis means to the inputs of said first, second, and third display means;

second analysis means coupled to said information carrying means for detecting signals having a second finite range of values and being representative of a second dimension of said information;

said second analysis means examining said information for signals in sequential increments of said second range of values;

said information being examined for signals in each increment of said second range of values for a second time duration and the examination of said information for signals throughout said second range repeating at a second constant period;

means coupling the signals detected by said second analysis means to the inputs of said first, second, and third display means;

third analysis means coupled to said information carrying means for detecting signals having a third finite range of values and being representative of a third dimension of said information;

said third analysis means examining said information for signals in sequential increments of said third range of values;

said information being examined for signals in each increment of said third range of values for a third time duration and the examination of said information for signals throughout said third range repeating with a third constant period;

means coupling the signals detected by said third analysis means to the inputs of said first, second, and third display means;

means for applying a first staircase sweep signal to one of said deflection circuits of said first display means, said first staircase sweep signal having a plurality of steps and a first fixed repetition period, each of said steps having a substantially constant duration;

means for applying a second staircase sweep signal to said one deflection circuit of said first display means, said second staircase sweep signal having a plurality of steps and a second fixed repetition period different from said first fixed repetition period, each of said steps having a substantially constant duration different from the duration of the steps of the first staircase sweep signal;

means for applying a third staircase sweep signal to said other deflection circuit of said first display means, said third staircase sweep signal having a plurality of steps and a third fixed repetition period, each of said steps having a substantially constant duration;

said first time duration being substantially equal to a multiple of the duration of each of the steps in the first staircase sweep signal and said first constant period being substantially equal to a multiple of the repetition period of said first staircase sweep signal;

said second time duration being substantially equal to a multiple of the duration of each of the steps in said third staircase sweep signal and said second constant period being substantially equal to a multiple of the repetition period of said third staircase sweep signal;

means for applying a fourth staircase sweep signal to one of said deflection circuits of said second display means, said fourth staircase sweep signal having a plurality of steps and a fourth fixed repetition period, each of said steps having a substantially constant duration, means for applying a fifth staircase sweep signal to said one deflection circuit of said second display means, said fifth staircase sweep signal having a plurality of steps and a fifth fixed repetition period different from said fourth fixed repetition period, each of said steps having a substantially constant duration different from the duration of the steps of the fourth staircase sweep signal;

means for applying a sixth staircase sweep signal to the other of said deflection circuits of said second display means, said sixth staircase sweep signal having a plurality of steps and a sixth fixed repetition period, each of said steps having a substantially constant duration;

said first time duration being substantially equal to a multiple of the duration of each of the steps in said fourth staircase sweep signal and said first constant period being substantially equal to a multiple of the repetition period of said fourth staircase sweep signal;

said third time duration being substantially equal to a multiple of the duration of each of the steps in said sixth staircase sweep signal and said third constant period being substantially equal to a multiple of the repetition period of said sixth staircase sweep signal;

means for applying a seventh staircase sweep signal to one of said deflection circuits of said third display means, said seventh staircase sweep signal having a plurality of steps and a seventh fixed repetition period, each of said steps having a substantially constant duration;

means for applying an eighth staircase sweep signal to said one deflection circuit of said third display means, said eighth staircase sweep signal having a plurality of steps and an eighth fixed repetition period different from said seventh fixed repetition period, each of said steps having a substantially constant duration different from the duration of the steps of the seventh staircase sweep signal;

means for applying a ninth staircase sweep signal to the other of said deflection circuits of said third display means, said ninth staircase sweep signal having a plurality of steps and a ninth fixed repetition period, each of said steps having a substantially constant duration;

said third time duration being substantially equal to a multiple of the duration of each of the steps in the seventh staircase sweep signal and said third constant period being substantially equal to a multiple of the repetition period of said seventh staircase sweep signal;

said second time duration being substantially equal to a multiple of the duration of each of the steps in the ninth staircase sweep signal and said second constant period being substantially equal to a multiple of the repetition period of said ninth staircase sweep signal.

14. The display system of claim 13 wherein said first analysis means comprises:

signal storage means having a plurality of storage segments;

each of said segments having signals with values falling into a single increment of said range of values read therein; and means for sequentially reading out the signals stored in said plurality of storage segments, said means taking said first time duration to read out a single one of said segments.

15. A display system for three dimensional information comprising:

information storage means having a plurality of storage segments;

input means coupled to said storage means for reading information into said storage segments;

output means coupled to said storage means for sequentially reading information out of said storage segments, each of said storage segments being read out for a first time duration and the reading out of all of said storage segments repeating with a first constant period;

a plurality of parallel paths, each having an input and an output terminal;

each of said paths including a mixer, bandpass filter, detector, and gate connected in series in the order named between said input and output terminals;

said output means being coupled to the input terminal of each of said paths;

each of said mixers having first and second inputs and an output;

each of said first inputs being connected to a respective one of said input terminals;

means coupling an oscillating signal to said second inputs, the frequency of said oscillating signal linearly varying with time through a range between first and second frequency limits with a second constant period, said frequency of said oscillating signal varying over an increment of said range between said first and second limits during a second time duration;

means also coupling a signal having a unique time varying frequency characteristic to each of said second inputs, each of said time varying frequency characteristics being repeated with a third constant period;

means sequentially switching said gates thereby coupling the signal applied to the input of each of said gates to the respective output terminal, each of said gates coupling the signal applied to the gate input to a respective one of said output terminals for a period equal to a third time duration;

first, second, and third information display means each having an input, horizontal deflection circuit, and vertical deflection circuit;

means coupling said output terminals to the inputs to said first, second, and third information display means;

means for applying a first staircase sweep signal to one of said deflection circuits of said first display means, said first staircase sweep signal having a plurality of steps and a first fixed repetition period, each of said steps having a substantially constant duration;

means for applying a second staircase sweep signal to said one deflection circuit of said first display means, said second staircase sweep signal having a plurality of steps and a second fixed repetition period different from said first fixed repetition period, each of said steps having a substantially constant duration different from the duration of the steps of the first staircase sweep signal;

means for applying a third staircase sweep signal to the other of said deflection circuits of said first display means, said third staircase sweep signal having a plurality of steps and a third fixed repetition period, each of said steps having a substantially constant duration;

said first time duration being substantially equal to a multiple of the duration of each of the steps in said first staircase sweep signal and said first constant period being substantially equal to a multiple of the repetition period of said first staircase sweep signal;

said second time duration being substantially equal to a multiple of the duration of each of the steps in said third staircase sweep signal and said second constant period being substantially equal to a multiple of the repetition period of said third staircase sweep signal;

means for applying a fourth staircase sweep signal to one of said deflection circuits of said second display means, said fourth staircase sweep signal having a plurality of steps and a fourth fixed repetition period, each of said steps having a substantially constant duration;

means for applying a fifth staircase sweep signal to said one deflection circuit of said second display means, said fifth staircase sweep signal having a plurality of steps and a fifth fixed repetition period different from said fourth fixed repetition period, each of said steps having a substantially constant duration different from the duration of the steps of the fourth staircase sweep signal;

means for applying a sixth staircase sweep signal to the other of said deflection circuits of said second display means, said sixth staircase sweep signal having a plurality of steps and a sixth fixed repetition period, each of said steps having a substantially constant duration;

said first time duration being substantially equal to a multiple of the duration of each of the steps in the fourth staircase sweep signal and said first constant period being substantially equal to a multiple of the repetition period of said fourth staircase sweep signal;

said third time duration being substantially equal to a multiple of the duration of each of the steps in the sixth staircase sweep signal;

means for applying a seventh staircase sweep signal to one of said deflection circuits of said third display means, said seventh staircase sweep signal having a plurality of steps and a seventh fixed repetition period, each of said steps having a substantially constant duration;

means for applying an eighth staircase sweep signal to said one deflection circuit of said third display means, said eighth staircase sweep signal having a plurality of steps and an eighth fixed repetition period different from said seventh fixed repetition period, each of said steps having a substantially constant duration different from the duration of the steps of the seventh staircase sweep signal;

means for applying a ninth staircase sweep signal to the other of said deflection circuits of said third display means, said ninth staircase sweep signal having a plurality of steps and a ninth fixed repetition period, each of said steps having a substantially constant duration;

said third time duration being substantially equal to a multiple of the duration of each of the steps in said seventh staircase sweep signal and said third constant period being substantially equal to a multiple of the repetition period of said seventh staircase sweep signal;

said second time duration being substantially equal to a multiple of the duration of each of the steps in said ninth staircase sweep signal and said second constant period being substantially equal to a multiple of the repetition period of said ninth staircase sweep signal.

* * * * *